US009671786B2

(12) United States Patent
Baltes et al.

(10) Patent No.: US 9,671,786 B2
(45) Date of Patent: Jun. 6, 2017

(54) METHOD AND SYSTEM FOR ROBOT GENERATION

(75) Inventors: Hansjorg Baltes, Winnipeg (CA); Jack Elmin Peterson, Winnipeg (CA); Shawn Samuel Schaerer, Winnipeg (CA); Xiao-Wen Terry Liu, Winnipeg (CA); Brian P. McKinnon, Winnipeg (CA); Sara Epp, Winnipeg (CA); Vergil Kanne, Winnipeg (CA); Shane Yanke, Winnipeg (CA)

(73) Assignee: WHITE MAGIC ROBOTICS INC., Winnipeg (CA)

( * ) Notice: Subject to any disclaimer, the term of this patent is extended or adjusted under 35 U.S.C. 154(b) by 309 days.

(21) Appl. No.: 13/399,505

(22) Filed: Feb. 17, 2012

(65) Prior Publication Data

US 2012/0150345 A1    Jun. 14, 2012

Related U.S. Application Data

(63) Continuation of application No. 12/499,411, filed on Jul. 8, 2009, now abandoned, which is a continuation
(Continued)

(51) Int. Cl.
*G06F 19/00* (2011.01)
*G05D 1/02* (2006.01)

(52) U.S. Cl.
CPC ......... *G05D 1/0274* (2013.01); *G05D 1/0227* (2013.01); *G05D 1/0246* (2013.01);
(Continued)

(58) Field of Classification Search
CPC combination set(s) only.
See application file for complete search history.

(56) References Cited

U.S. PATENT DOCUMENTS 5,084,826 A * 1/1992 Hariki ............ G05B 19/41815
  700/248
5,963,712 A * 10/1999 Fujita ................... B25J 9/1615
  318/568.12
(Continued)

OTHER PUBLICATIONS

Dixon, K.; Dolan, J.; Wesley Huang; Paredis, C.; Khosla, P., "RAVE: A real and virtual environment for multiple mobile robot systems," Intelligent Robots and Systems, 1999. IROS '99. Proceedings. 1999 IEEE/RSJ International Conference on, vol. 3, pp. 1360-1367, 1999.*
(Continued)

*Primary Examiner* — Jonathan L Sample
(74) *Attorney, Agent, or Firm* — Bereskin & Parr LLP/S.E.N.C.R.L., s.r.l.

(57) ABSTRACT

A method is provided for the automatic generation of a robotic devices, where the method comprises the steps of receiving user input to determine a task specification for one or more tasks for the robotic device, determining a task list comprising one or more tasks based on the provided task specification, determining based on the task list provided, one or more mechanical components, one or more processing components, and logic components required to execute one or more tasks; and generating the logic components required to execute one or more tasks, and embedding the logic components onto a recordable medium associated with the robotic device.

25 Claims, 14 Drawing Sheets

Related U.S. Application Data of application No. PCT/CA2008/000041, filed on Jan. 11, 2008.

(60) Provisional application No. 60/880,059, filed on Jan. 12, 2007.

(52) U.S. Cl.
CPC ......... *G05D 1/0255* (2013.01); *G05D 1/0261* (2013.01); *G05D 1/0272* (2013.01); *G05D 1/0278* (2013.01); *G05D 2201/0203* (2013.01); *G05D 2201/0215* (2013.01)

(56) References Cited

U.S. PATENT DOCUMENTS

| | | | | |
|---|---|---|---|---|
| 6,266,577 B1* | 7/2001 | Popp | ............... | B25J 9/163 700/245 |
| 6,324,443 B1* | 11/2001 | Kurakake | ............... | B25J 9/1656 318/568.24 |
| 7,211,980 B1* | 5/2007 | Bruemmer | ............... | G05D 1/0214 318/567 |
| 7,236,861 B2* | 6/2007 | Paradis | ............... | G05D 1/0088 701/120 |
| 7,467,026 B2* | 12/2008 | Sakagami | ............... | B25J 9/1694 318/568.12 |
| 7,539,558 B2* | 5/2009 | Adachi | ............... | B25J 9/0003 700/245 |
| 7,912,633 B1* | 3/2011 | Dietsch | ............... | G01C 21/20 701/450 |
| 8,200,700 B2* | 6/2012 | Moore | ............... | G06F 17/30575 707/791 |
| 2004/0024490 A1* | 2/2004 | McLurkin | ............... | G06N 3/008 700/245 |
| 2004/0162638 A1* | 8/2004 | Solomon | ............... | G05D 1/0088 700/247 |
| 2005/0065652 A1* | 3/2005 | Sakagami | ............... | B25J 9/1694 700/245 |
| 2005/0113974 A1* | 5/2005 | Doi | ............... | B25J 5/00 700/245 |
| 2006/0079997 A1* | 4/2006 | McLurkin | ............... | G06N 3/008 700/245 |
| 2007/0031217 A1* | 2/2007 | Sharma | ............... | B25J 5/007 414/222.08 |
| 2007/0061040 A1* | 3/2007 | Augenbraun | ............... | A47L 5/225 700/245 |
| 2007/0061043 A1* | 3/2007 | Ermakov | ............... | A47L 5/225 700/263 |
| 2007/0061487 A1* | 3/2007 | Moore | ............... | G06F 17/30575 709/246 |
| 2007/0179669 A1* | 8/2007 | McLurkin | ............... | G06N 3/008 700/245 |
| 2007/0208442 A1* | 9/2007 | Perrone | ............... | G05D 1/0088 700/95 |
| 2007/0250212 A1* | 10/2007 | Halloran | ............... | A47L 5/30 700/245 |
| 2007/0271002 A1* | 11/2007 | Hoskinson | ............... | G06Q 10/06 700/245 |
| 2008/0009967 A1* | 1/2008 | Bruemmer | ............... | G05D 1/0088 700/245 |
| 2008/0009968 A1* | 1/2008 | Bruemmer | ............... | G06N 3/008 700/245 |
| 2008/0009969 A1* | 1/2008 | Bruemmer | ............... | G06N 3/008 700/245 |
| 2008/0009970 A1* | 1/2008 | Bruemmer | ............... | G05D 1/0088 700/245 |
| 2008/0161970 A1* | 7/2008 | Adachi | ............... | B25J 9/0003 700/253 |
| 2009/0234788 A1* | 9/2009 | Kwok | ............... | G06N 3/006 706/46 |
| 2009/0248200 A1* | 10/2009 | Root | ............... | B25J 9/1689 700/245 |
| 2009/0306823 A1* | 12/2009 | Baltes | ............... | G05D 1/0274 700/245 |
| 2012/0150345 A1* | 6/2012 | Baltes | ............... | G05D 1/0274 700/245 |
| 2013/0218346 A1* | 8/2013 | Root | ............... | B25J 9/1689 700/264 |

OTHER PUBLICATIONS

1st Office Action with English translation dated Oct. 21, 2010 (issued in CN Application No. 200880008371.7).

Dixon, K. et al., "RAVE: a real and virtual environment for multiple mobile robot systems", Intelligent Robots and Systems, 1999 IROS '99. Proceedings. 1999 IEEE/RSJ International Conference on vol. 3, pp. 1360-1368, 1999.

2nd Office Action with English translation dated Jan. 12, 2012 (issued in CN Application No. 200880008371.7).

3rd Office Action with English translation dated Aug. 10, 2012 (issued in CN Application No. 200880008371.7).

International Search Report & Written Opinion (May 13, 2008) International Application No. PCT/CA2008/000041.

International Preliminary Report on Patentability (Jul. 14, 2009) International Application No. PCT/CA2008/000041.

Hornby, G.S. et al., "Generative representations for the automated design of modular physical robots", Robotics and Automation, IEEE Transactions on, vol. 19, No. 4, pp. 703-719, Aug. 2003.

Response to 1st OA in CN Application No. 200880008371.7 (as filed May 5, 2011).

Response to 2nd OA in CN Application No. 200880008371.7 (as filed Jun. 20, 2012).

Response to 3rd OA in CN Application No. 200880008371.7 (as filed Dec. 24, 2012).

Document related to EP Application No. 08700508.8 dated Jun. 25, 2013 (Extended European Search Report).

Notification of Grant with English translation dated Apr. 9, 2013 (issued in CN Application No. 200880008371.7).

* cited by examiner

METHOD AND SYSTEM FOR ROBOT GENERATION

FIELD

The invention relates generally to the field of robotics, and more specifically to improved methods and systems for generating robot devices.

BACKGROUND

Predictions have been made many years ago, and continue to be made that in the years to come, there will be an ever increasing reliance on the use of robotic devices by the average consumer. While currently there are many methods and systems that employ robotic devices to accomplish specific tasks, these robotic devices are generally used for specialized purposes.

One of the main reasons that the use of robots has not caught on as had been predicted, is attributable to the great deal of time and effort that is involved in designing and developing even a simple robot that is used to accomplish simple tasks. Also, while there has been significant effort devoted to designing robots, there are limitations associated with the development of robots. Current limitations associated with designing robots include the complex nature of skills that are involved in designing and developing robots, and the lack of portability with current robotic designs for extension to the design of new robots, and the inability of robotic devices to respond to unforeseen situations or circumstances.

SUMMARY

In a first aspect of the invention, a method for the automated generation of a robotic device in whole or in part is provided for. The method comprises the steps of eliciting and receiving user input to determine a task specification for one or more tasks for the robotic device; determining a task list comprising one or more tasks based on the provided task specification; determining based on the task list provided, one or more movement components, one or more processing components, and logic components required to execute one or more tasks; and generating the logic components required to execute one or more tasks, and embedding the logic components onto a recordable medium associated with the robotic device.

In a second aspect of the invention, a method of creating a robotic device, wherein an environment for the robotic device to operate in is provided, the method comprises inputting a map that defines the area of the environment; inputting a starting point indicating a position within the area that the robotic device is to start operating from inputting one or more stopping points along a route emanating from the starting point that the robotic device is to follow; and inputting one or more tasks to be completed by the robotic device at the starting points, stopping points or along the route.

In another aspect of the invention, a method of specifying one or more tasks for a robotic device to complete is provided. The method comprises specifying whether the robotic device is a physical robotic device or a virtual robotic device; specifying a location for the robotic device to operate in; specifying an activity for the robotic device to undertake; and providing detailed information regarding the activity that the robotic device is to undertake.

In another aspect of the invention, a method of completing one or more tasks by a plurality of robotic devices operating in a team environment is provided. The method comprises selecting one or more of the plurality of the robotic devices to be a controlling robotic devices; determining at the controlling robotic device whether new robotic specifications are required for one or more of the plurality of robotic devices; transmitting requests for new robotic specifications from the controlling robotic device to a robotic server; and receiving the new robotic specifications at the one or more of the plurality of robotic devices.

BRIEF DESCRIPTION OF THE DRAWINGS

For a better understanding of embodiments of the system and methods described herein, and to show more clearly how they may be carried into effect, reference will be made by way of example, to the accompanying drawings in which.

DETAILED DESCRIPTION

Figure 1:
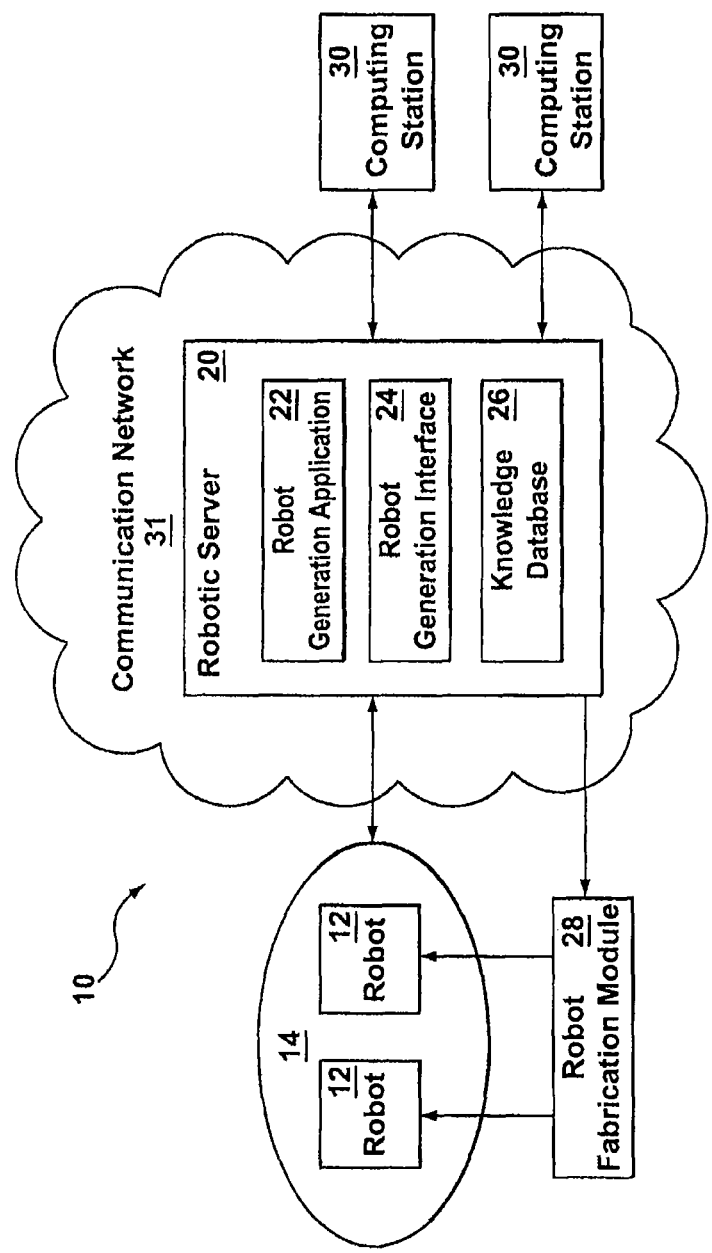
FIG. 1 is a block diagram illustrating components of a robot generation system.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Reference is now made to FIG. 1, where a block diagram illustrating the components of a robot generation system 10 is shown. The robot generation system 10 is used to generate robotic devices 12 which may be real robotic devices, virtual robotic devices and robotic devices that comprise a mixture of real and virtual components referred to as mixed reality robotic devices. The system 10 in an exemplary embodiment is comprised of one or more robotic devices 12. A group of one or more robotic devices 12 may be referred to as a robotic team 14. The robotic devices 12 interact with and receive instructions through a robotic server 20. The robotic server 20 is used to receive instructions regarding a robotic device 12 that is created and performs the processing required to determine the components associated with a robotic device 12. The robotic server 20 is also referred to as the robotic controller, and in an exemplary embodiment, as described below is comprised of a robot generator application 22, a robot generation interface 24, and a knowledge database 26. The robotic server 20 receives instructions from one or more users who are communicating with the robotic server 20 through a computing device 30. The computing device 30 interacts with the robotic server 20 through a communication network of any kind 31.

The robotic device 12 operates in a defined environment and by implementing the task specification performs one or more tasks that have been defined for the device 12. The environment that the robotic device 12 operates in may include real settings, simulated settings or mixed reality settings. Examples of such real environments include, but are not limited to, home environments, office environments, parks, shopping centres, malls, processing and manufacturing plants, oil drilling and mining environments, refineries, flight and space environments, medical and microscopic environments, and any other environment that may be described with respects to its area and potential obstacles. In an exemplary embodiment the user will generally describe the location of the environment (i.e. indoor, outdoor or both), the type of environment (i.e. virtual environment, real environment or mixed), the type of control (i.e. user controlled or self controlled). As described in further detail below, the user may further specify points of interest, starting points, directions of travel and task for competition for a robotic device within the environment. Standard distinctions include but are not limited to: indoor, outdoor or mixed environments; virtual, physical or mixed reality; self-controlled, user-controller, or user-guided; while distinctions such as travel between waypoints, fully cover a given area or wander, or specific obstacles, or specific tasks may be specified relative to a particular application. Simulated settings include any virtual environment that is defined in which a virtual robotic device 12 may operate, and examples of such virtual environments include virtual environments that are used in simulations such as video games and environments that provide for training through simulations. Examples of such training environments may include, but are not limited to, simulated operating room environments, simulated disaster/rescue environments, and simulated space environments. Mixed reality settings may include any environment that is defined in which a real, virtual or mixed reality robotic device may operate, and examples of such mixed reality environments include, but are not limited to, real environments where a part of the environment is a virtual environment projected into or onto the real environment. The tasks may include any activities or actions that are defined for the robotic device to complete within the defined environment.

The robotic team 14 may include any number of robotic devices 12. The robotic devices 12 that are part of a robotic team collaborate to perform tasks that have been defined for robotic devices 12 in a particular environment. The robotic devices 12 within a robotic team 14 may interact with one another to complete defined tasks. The interaction between robotic devices 12 may consist of exchange of sensor data, action plans, and/or control instructions and controlling the overall operation of the respective other robotic devices 12.

The robotic server 20 is a computing device that is used to generate robotic devices, and more specifically, the firmware, hardware and software (referred to as logic components) that are associated with a robotic device 12. The robotic server 20 is engaged through the use of computing stations 30 when a user wishes to initiate the process by which a robot is generated, or to interact with an already generated robotic device 12. In an exemplary embodiment, the robotic server 20 may be accessed by multiple computing stations 30 through a communication network 31. In an alternate embodiment, the server 20 and computing station may reside on the same computer, and need not be separate devices. The robotic server 20 may be a web application, cloud computer, networked computer, personal computer, handheld computer or may be found on a mobile device.

The robotic generator application 22 is resident upon the robotic server 20 in an exemplary embodiment. The robot generator application 22 in alternative embodiments may be distributed across two or more devices 12. The robotic generator application 22 therefore may be accessed by multiple computing devices. The robotic generator application 22 is described in further detail with respect to FIG. 3. The robot generator application 22 when engaged allows for a description of the robotic device 12 that is to be generated to be received, such that an appropriate design solution may be created.

The robotic generation interface 24 is used to receive instructions from users concerning the design of a robotic device 12 and to interact with an already created robotic device 12. The generation interface 24 also generates a customized interface according to the specifications of the robotic device 12, to allow the user to control the operation of the device 12 as required.

The knowledge base module 26, in an exemplary embodiment is a data storage or repository that stores multiple types of information that are used in the generation of components for the robotic devices 12. In an exemplary embodiment, as described in FIG. 4, multiple types of knowledge bases are provided for, where the knowledge bases are accessed and used by the robotic generator application 22 to determine the specifications of a robot and to create the robotic device 12.

The robot fabrication module 28 receives all of the hardware, software, and firmware specifications for inclusion in the robotic device 12. When the robotic fabrication module 28 has received instructions for the creation of a robotic device 12, the fabrication module 28 may generate a robotic system on chip (RSOC). The fabrication module may generate the components of the robotic device 12 such that the robotic device may comprise any combination of an RSOC, robot specifications, firmware downloads, firmware ROM, software modules, mechanical fabrications such as through CNC, and MEMS/NEMS fabrication. The determination as to the components of the robotic device 12 will vary depending on the nature, use and purpose of the robotic device 12 that is to be created, as specified by the user in the robot creation method as is explained below. For example, the components of the robotic device 12 that are created by the robot fabrication module 28 may vary depending on whether the robotic device is for mass marketing, or whether it is for a one-time creation. The fabrication module 28 receives outputs that are provided by the various generators and this information is then used to fabricate the robotic device 12. The outputs that are provided by the generators, in an exemplary embodiment, are specifications of the components that should be generated. The components to be generated are described in an exemplary embodiment by identifying what may be referred to as high level component groups. High level components groups may include, but are not limited to, motors, sensors, actuators, mechanical components, software and firmware, logical and processing components. These high level component groups may be further subdivided into more specific components, such as temperature, audio, visual, touch and environment sensors. The components may include mechanical components, processing components, and logic components. In an exemplary embodiment, the specification is provided in XML format, and may represent actual software code, or specifications. With regards to the mechanical components associated with robotic devices, in an exemplary embodiment, the specification comprises a description of the mechanical components that should be used in the assembly of the robotic device 12. The mechanical components may include, but are not limited to, wheels, joints, gears, chassis, grippers, sensor and actuators. The mechanical components may be described in relation to any combination of the manufacturer, manufacturer's instructions, device type, electrical requirements, firmware interfaces, size, weight and cost. The specifications are provided in a file format such as XML in an exemplary embodiment. After receiving such a specification, the physical components of the robotic device 12 may be manually assembled, or alternatively may be assembled through automated processes.

As an example, for a robotic device 12 that has been provided with the task of performing a cleaning task, the fabrication module 28 receives from the various generators, as described below, a specification of all of the physical (mechanical) components that are necessary to construct the robotic device. Such a description may include the various specifications associated with any sensors, and actuators, and with mechanical specifications for the chassis and base associated with the device 12. The specification may also include electrical and electronic components which may include, but is not limited to, processors, memory, wiring, storage. The specification also includes software, operating system information and descriptions of the environment. The software includes, but is not limited to the respective behaviours, routines, algorithms, heuristics and any artificial intelligence components. The robotic device 12, once assembled, then has the appropriate software/firmware that is required for its operation downloaded to the robotic device 12. In an exemplary embodiment, based on specifications that have been provided by the various generators, as described below, the fabrication module 28 creates the software/firmware for the robotic device 12.

The computing devices 30 that may engage the robotic generation server 20 may be any type of computing device that a user may be able to provide input to, and include but are not limited to laptop computers, slimline computers, mainframe computers, handheld computers, video game type console computers, cloud computers, cellular devices and any other computing device or devices that has processing capabilities and may receive input.

Figure 2:
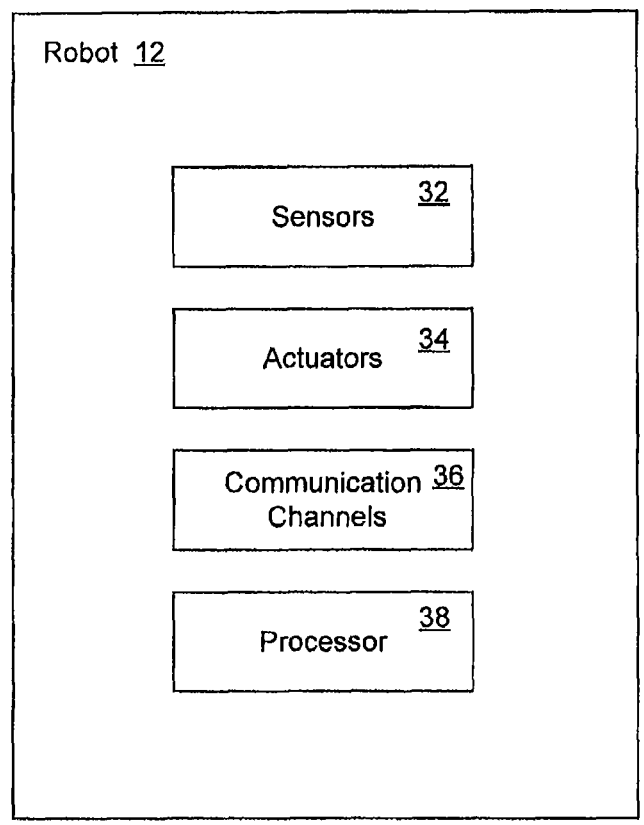
FIG. 2 is a block diagram illustrating the components of a robotic device.

Reference is now made to FIG. 2, where a block diagram illustrating the components of a robotic device 12 are shown in an exemplary embodiment. The robotic device 12 in an exemplary embodiment is comprised of one or more sensors 32, one or more actuators 34, one or more communication channels 36, at least one processor 38 and power sources and memory storages (not shown). The robotic device 12 is comprised of various hardware, software and firmware components (logic components) that may be stored externally, internally or on a combination of both to the robotic device 12. The sensors 32 associated with the robotic device may include visual sensors, audio sensors, and temperature sensors or any other sensors that are used to determine characteristics regarding the environment within which the robotic device 12 operates. The sensed characteristics are then transmitted to the processor 38, where they may then optionally be transmitted to devices including the robotic controller that allow for external control of the robotic device, or to other robotic devices 12 that are part of a robotic team 14. The actuators are able to perform various actions within a respective environment, and examples of such actions include, movement within the environment, and engaging with one or more objects within the environment. The communication channels 36 allow for wired or wireless communication with external components or devices. Communications that are sent to, and received from external communication devices allow for exchange of sensor data as well as instructions to be received that allow for control of the device 12. The processor 38 associated with the robotic device is used to execute commands and receive and send instructions such that the robotic device 12 will operate in a specified manner.

The robotic device 12 based on the process of generating the components of the robotic device 12 is designed and implemented to accomplish one or more tasks within an environment, without the requirement of any specific instructional interaction from a user. The robotic device 12, has been described in this exemplary embodiment as a physical entity, however, it should be noted that in alternative embodiments the robotic devices may be represented in virtual environments, simulated environments or mixed reality environments.

Figure 3:
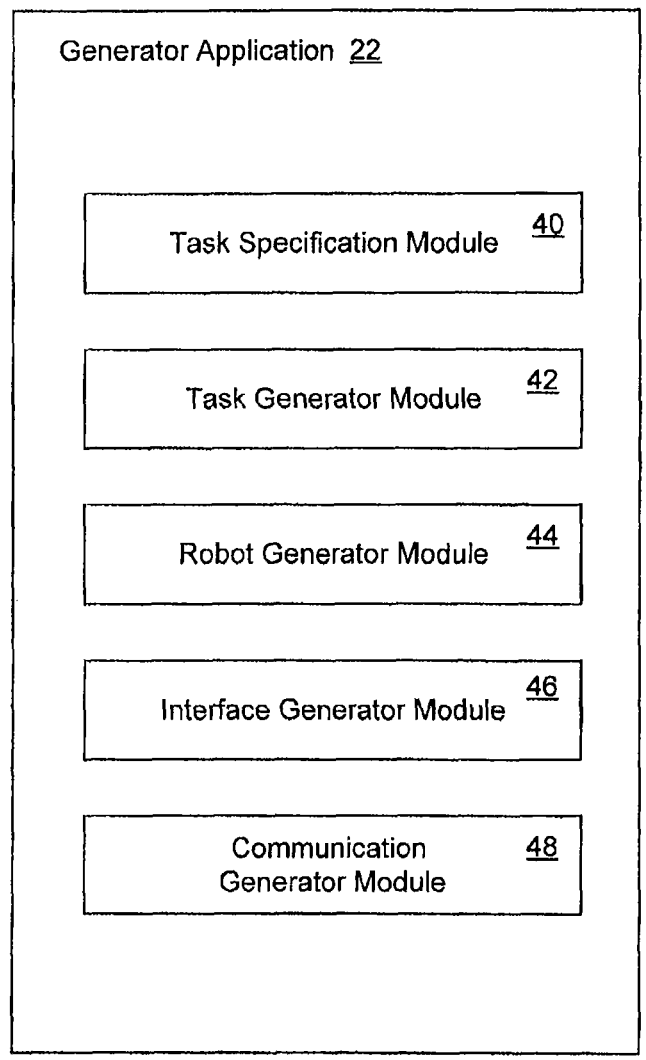
FIG. 3 is a block diagram illustrating the components of the generator.

Reference is now made to FIG. 3, where the components of the generator application 22 are shown in an exemplary embodiment. The generator application 22 is used to specify the purpose of the creation of the robotic device 12, and then to create the robotic device without the need of any further low-level specification or programming by a developer. The generator application 22 will therefore allow for the automatic generation of the various hardware, software and firmware components that are to be associated with the robotic device 12 based on user specifications.

In an exemplary embodiment, the generator application 22 comprises the following components, a task specification module 40, a task generator module 42, a robot generator module 44, an interface generator module 46, and a communication generator module 48. The various components associated with the generator application 22 are able to interact with the components associated with the knowledge module 26 as described in further detail below with reference to FIG. 4 and this therefore allows the generation of the components associated with the robotic device 12.

The task specification module 40 is engaged by a user through the generator application 22 which provides the purpose and other details associated with the creation of a robotic device 12. The user provides descriptions of the tasks that are to be associated with a robotic device 12, as described in further detail below. In an exemplary embodiment, the user engages the task generator module 40 through a user interface that may include multiple types of interaction with the user. A task description associated with the creation of a robotic device 12 may first be determined based on any combination of questions and answers, multiple choice questions, pictorial engagement where the user may manipulate graphical objects that may be used to provide descriptions of the tasks. The user may provide task descriptions of tasks that have been previously accomplished, or for tasks that are similar to tasks that have previously been accomplished. The user may also engage already designed and implemented robotic devices 12 to provide task descriptions through robotic devices 12 that have associated vision recognition systems and other sensory components. Other sensory components may include, but are not limited to, auditory and touch sensors. The vision recognition system may be used to specify to the robotic device 12 what areas they may traverse for example. In one exemplary embodiment, the sensory component may be used to specify the areas to traverse where various identified markers are placed in the environment. The markers may symbolize areas that may and may not be traversed. The respective identifiers may be detected by sensors including but not limited to vision, GPS, RFID, audio, bumpers or shaft encoder systems. The respective environments may be represented in a map form which may contain varying levels of detail.

In an exemplary embodiment, the task specification module 40 first receives from the user, descriptions of the tasks that the robotic device 12 will implement, along with the skill level (this may range from a new beginner to an experienced user) associated with the user. Based on the specification of a skill level, any exchange of communication between the user and the respective interface is adjusted for the appropriate level. In an exemplary embodiment, the functionality that is provided to the user may vary depending on the skill-level and associated privileges given to a user. In certain embodiments, advanced users may be provided with the ability to specify a higher level of detail that is used for the generation of a robotic device 12. Upon receiving a description of the task specification, the task specification module 40 as detailed below, creates a specification of the tasks that are to be performed by the robotic device 12 and any information related to constraints associated with the environment in which the robotic device 12 operates. The constraints and tasks that have been specified are then used by the task generator module 42 to generate the appropriate hardware/software specifications that are to be used by the robotic device 12. In an exemplary embodiment, task specification details may be constructed using an expert system that employs a series of questions and choices to narrow the specification from a generalized range of possibilities to one or more focused and specific tasks. Also, learning algorithms may be used, where the previous actions are examined to help determine future actions. Further, cased-base reasoning algorithms may also be used. The task generator module 42 receives various inputs in order to generate the hardware/software specifications and this is described in further detail below. The task generator module 42 receives a high level specification of a task that has been provided by the user. If a similar or identical task has previously been implemented, the task generator module 42 retrieves the specifications from the appropriate knowledge database. The user may provide input to further clarify or specify a pre-existing task specification. A new task may also be composed of several pre-existing tasks. The task generator in an exemplary embodiment, as is further described with regards to FIG. 5, receives as input the tasks that have been specified for a particular robotic device, information pertaining to the environment within which it will operate, and processing requirements. Information regarding the environment within which a robotic device 12 operates includes, but is not limited to, information pertaining to the dimensions of the area, obstacles, and environmental conditions. Physical capabilities and costs may also be provided as aspects of the task specification. The processing requirement determinations are made once a determination is made as to the tasks that a robotic device 12 is to implement based on the computation requirements that are associated with implementations of such tasks. The respective knowledge database that the generator module 42 interacts with stores data pertaining to the processing requirements that are associated with various tasks. For example, the knowledge database 62 will specify for any particular task the type of processor required (i.e. a micro-controller, or a larger processor such as a desktop processor are two such examples). The task generator module 44, first receives the specification of the tasks, and then develops a task list. The development of the task list is based on interaction with the task generator knowledge database 62 as is described with reference to FIG. 7. Based on the interaction with the task generator knowledge database 62 as is explained in further detail below, a task list is specified where the tasks that a robotic device 12 executes are specified. Also, the task generator module 42 develops based on interaction with the knowledge generator 62 various control system functionalities. Control system functionalities are used to refer to control of the robotic devices 12 lower level functionality which may relate to movement capabilities for example. One example of determining the constraints associated with a robotic device 12 is to take the example of a robotic device that has to perform multiple similar movements on a repeated basis. Such a robot requires a high degree of stability and repeatability in its movements, as future movements may not be possible if prior movements fail. These constraints would narrow the robot device selection by removing experimental robots from the range of possibilities. Should the movement include moving through hallways repeated, such as in a surveillance robot, wheeled robots may be chosen instead of the less stable humanoids. The respective knowledge database and generator module determine the appropriate algorithms that are to be implemented by the robotic device 12 to implement the tasks from the tasks list. These algorithms may include, but are not limited to, localization algorithms, path planning algorithms, computer vision algorithms, pattern recognition algorithms, learning algorithms, behaviour patterns, heuristics, and case-based reasoning. The various hardware/software/and firmware specifications are referred to as logic components.

Figure 6:
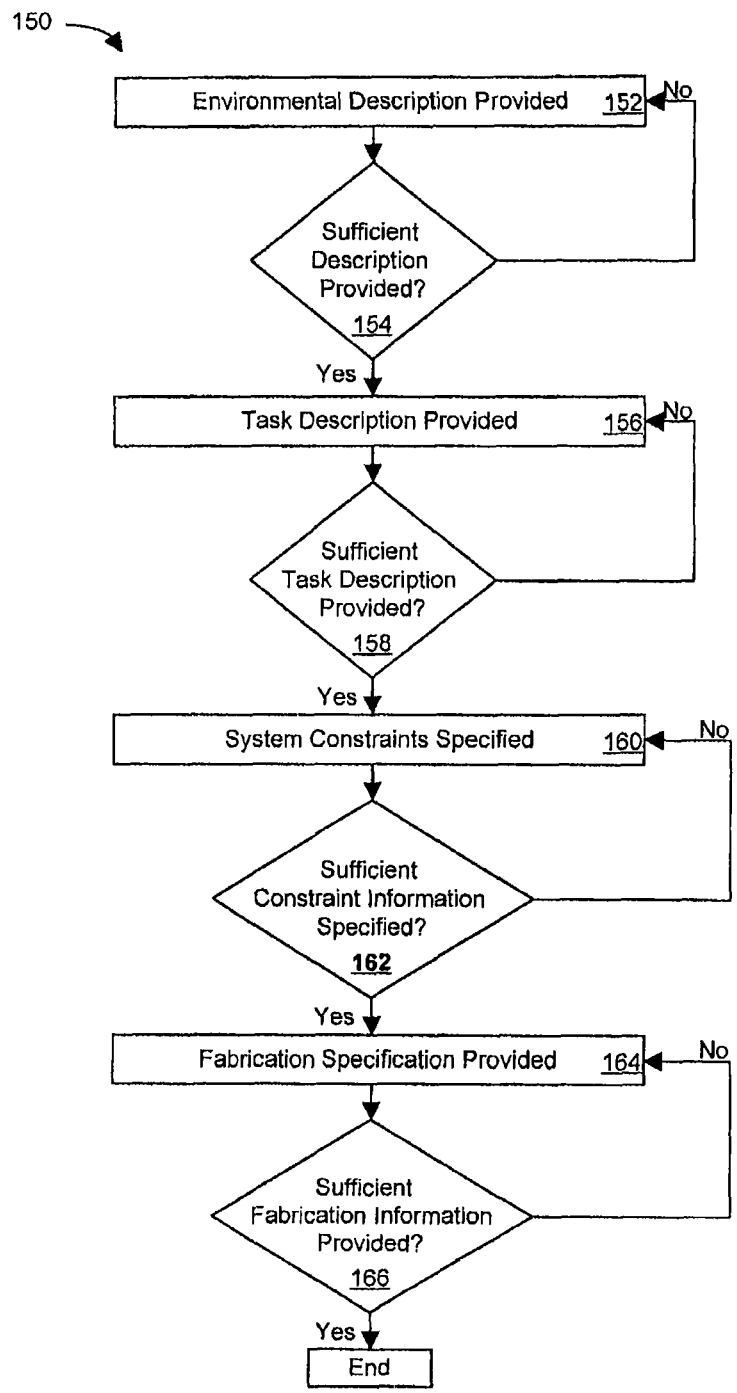
FIG. 6 is a flowchart illustrating the steps of a task specification method.
Figure 7:
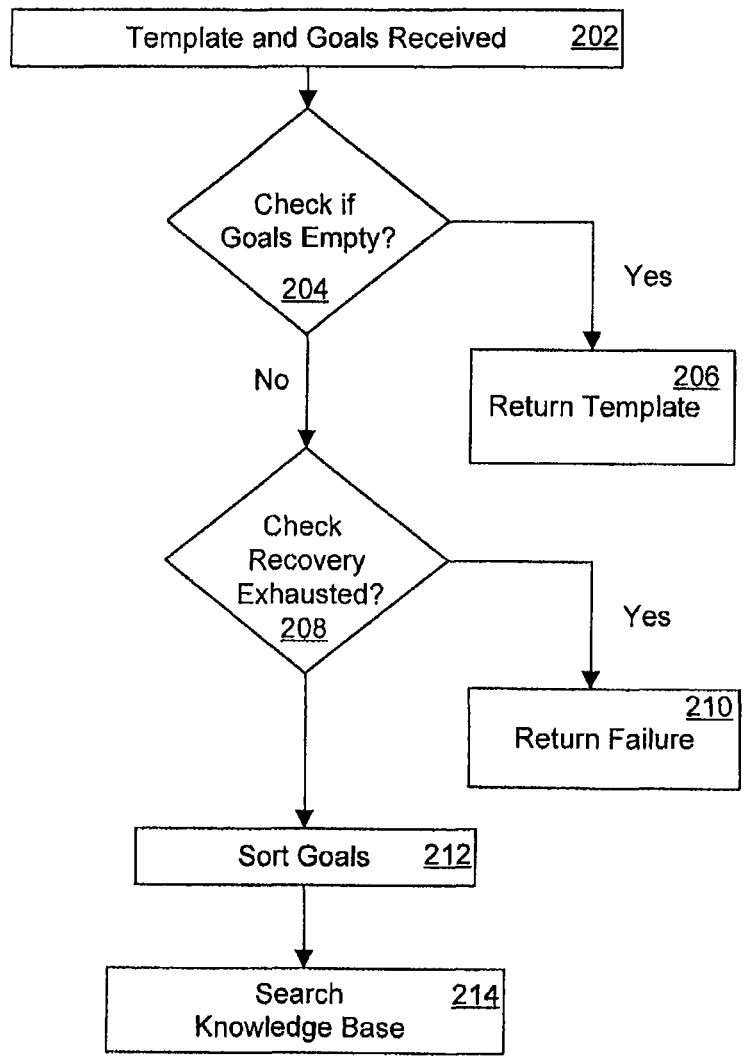
FIG. 7 is a flowchart illustrating the steps of a task generation method.

The operation of the task specification module 42 is further described with respect to the operation of the task specification method 150 as shown in FIG. 6 and the interaction between the task generator module and the task generator knowledge database 62 is described in further detail with respect to FIG. 7.

The robot generator module 44, receives input from the task specification module 42. Based on the various inputs that are provided to the robot generator module 44, the module 44 makes various determinations as to the requirements that are to be associated with the robotic device 12. Such determinations include determining the robotic base which refers generally to the base of the device 12. For example, if the robotic device 12 is to perform actions on water, then a robotic device that is implemented on a platform such as a boat is used, also if the robotic device 12 is to perform tasks that require the robotic device 12 to be in the air, then the base will be built upon on an airplane based platform. Other determinations include the determination as to the processing requirements and other robotic components that make up the robotic device 12 (may include, but is not limited to, robotic arms, robotic joints, other mechanical components, and potential coverings for the robotic device). The robot generator module 44 determines these requirements based on interaction with the robotic generator knowledge base 64 The task specification from the user is refined until the robot generator's range of possibilities either contains a single matching response (no other options remain), or a response set has been retrieved from the knowledge base that includes an acceptable solution. Once a solution is available, the robot can either be generated, or if further specifications are given by the user, the robot can be further refined until the solution is acceptable or the only possible one. If no solutions exist, the specifications cannot be met. As an example, sensors may be selected based on the task specifications. If, for example, the robotic device 12 is required to monitor the air quality of the environment, then sensors such as gas and $CO_2$ will be added to the physical makeup of the robotic device 12. If a maximum cost is specified, components that meet the specified cost will be selected whereas if reliability is specified, highly reliable components will be selected instead. The interface generator module 46 generates an appropriate interface that allows a user to interact with a robotic device 12. Specifically, the interface generator 46 receives information regarding the type of interface (i.e. wired or wireless) which determines characteristics of the interface (e.g., maximum bandwidth, reliability), and a description of the type of computing device that the robotic device 12 will communicate with (i.e. a PDA, desktop computer). The type of computer device determines the screen sizes, computing power, and storage characteristics of the interface. The method by which the interface generator module 46 determines the interface components is described in further detail with regards to the interaction between the appropriate knowledge base and the interface generator module 46.

The communication generator module 48 is used to generate the various communication tools that are used by the robotic devices 12. The communication generator module 48 determines the method employed by various devices 12 to communicate. The determinations in an exemplary embodiment include the specification of which protocol is used to communicate, and this may include, protocols including, but not limited to, UPD, RF, Morse Code, vision-based communication, and natural language communication. The communication generator module 48 interacts with the communication knowledge base 68 to determine the appropriate communication tools that are to be used by the robotic device 12.

Figure 4:
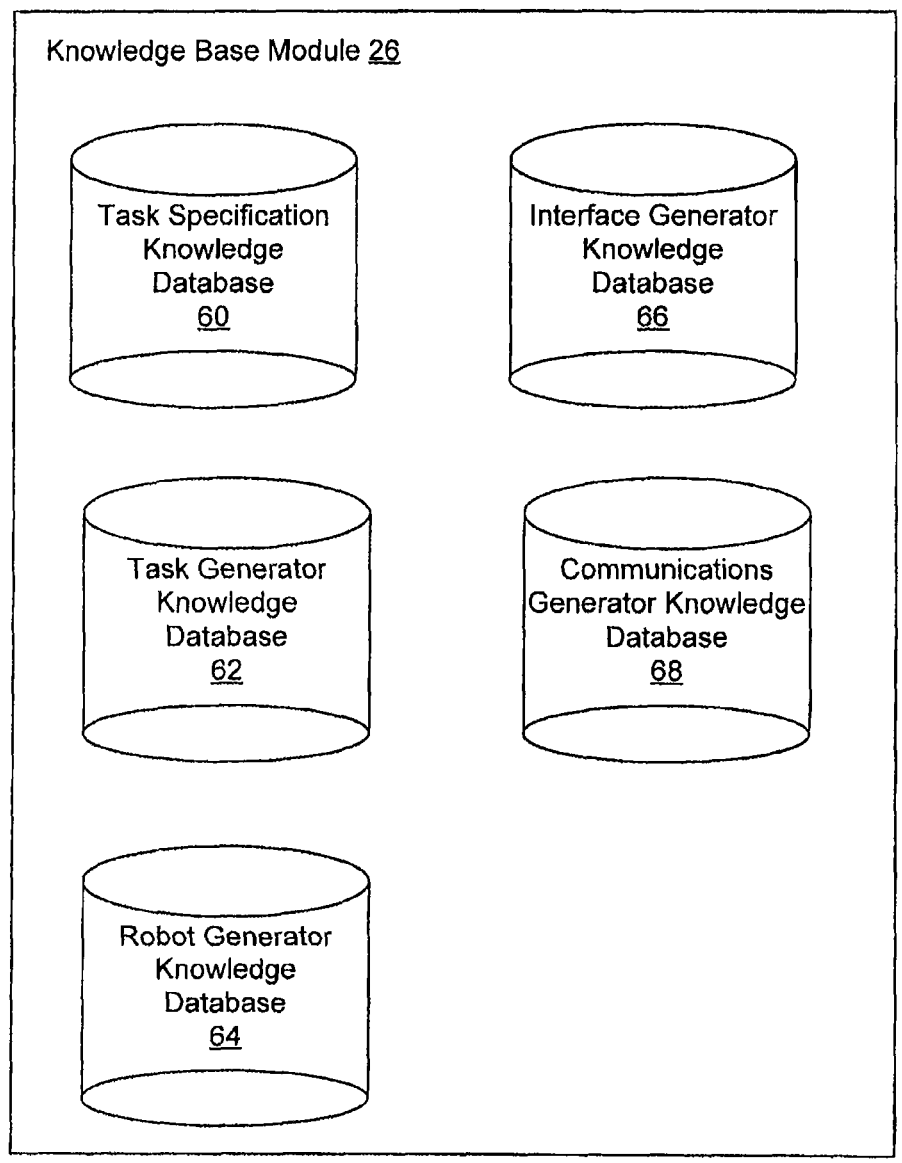
FIG. 4 is a diagram illustrating the components of the knowledge base module.

Reference is now made to FIG. 4, where the components of the knowledge base module 26 are shown in an exemplary embodiment. For purposes of description the knowledge databases have been described as separate knowledge databases. In an exemplary embodiment, the knowledge base module 26 comprises a task specification knowledge database 60, a task generator knowledge database 62, a robot generator knowledge database 64, an interface generator knowledge database 66, and a communications generator knowledge database 68. The respective knowledge databases that are described in exemplary embodiments herein are described with respect to information that they contain therein that is used to generate one or more components of the robotic device 12.

The task specification knowledge database 60 is used by the task specification module 20 when interacting with the user who describes the tasks and provides information regarding the environment within which the robotic device 12 operates. In an exemplary embodiment, the task specification knowledge database 60 stores information regarding multiple user interfaces, and other information associated with a user specifying tasks for a robotic device that is to be generated. The user interfaces are used to receive the required specifications from the user. The user interfaces that are presented to the user may vary depending on a current state of the interaction. The knowledge database 60 may be used to employ various types of interfaces, including, but not limited to, question and answer forms, decision trees, graphical editors, forms with selectable lists of options, user navigational elements including next or back buttons, forms with default options enabled, and mandatory user input fields. The interface that is presented to the user may be based on the level of skill associated with the user and includes meta model information that helps determine the user interface. Meta models are used to encapsulate knowledge about various user types and their preferences in interacting with a computer or robotic systems. For example, the meta model may indicate that advanced users prefer textual input (e.g. programming) over graphical representations (e.g., visual programming). Meta models also allow the user to control the level of detail presented to them. For example, an administrator may choose to examine the code in great detail, optimising and fine-tuning it, while an end user may choose to simply use large amounts of system generated code. The administrator may administer the interfaces to allow for greater functionality where the user is presented with more options related to the potential tasks that a robotic device may accomplish. Also, the respective task specification knowledge database stores user interfaces that are associated with a specific robotic device 12 and its specifications.

The task generator knowledge database 62 stores information related to task considerations, task specific information, domain information, and historical information. The task generator knowledge database 62 stores the requirements associated with previous robotic systems. For example, for a robotic system 12 that was previously built, the database 62 will store information pertaining to the processing requirements for a particular task, the hardware and software requirements, and any other such information. The robot generator knowledge database 64 stores information that allows the robot generator module 44 to perform its respective tasks. In an exemplary embodiment, the robot generator knowledge database 64 stores information pertaining to material considerations associated with the design of a robotic device 12 (i.e. weight and cost considerations), information regarding previous designs, environmental considerations (information pertaining to how specific robotic components may be affected by the environment, processing capabilities, and information regarding available components for any robotic devices, including the actuator and sensor components that may be used in any design.

The interface generator knowledge database 66 stores information pertaining to considerations that are associated with the choice of an interface, for example including information pertaining to interface designs for previously generated robotic devices 12. Specifically, the interface generator knowledge database 66 stores information pertaining to system considerations related to the interface, including the platform on which it resides, the capabilities associated with the associated robotic device 12 and its components, physical connections between robotic device components and other information related to how the robotic device 12 may be affected by environmental conditions. With regards to system considerations, the interface generator knowledge database 66 stores information pertaining to the hardware and software associated with a particular interface. The hardware associated with a particular interface may include considerations related to the display type and information regarding components associated with the interface, including audio components, input components, and video components. With regards to software, the interface generator knowledge database 66 stores information pertaining to any GUI libraries and controls that were used in previous interface designs and that may be used in subsequent interface designs.

The communications generator knowledge database 68 stores information pertaining to how the robotic device 12 may communicate, and includes information pertaining to the communication devices and the associated specifications of previously designed robotic devices. The communications generator knowledge database 68, in an exemplary embodiment, stores information relating to the requirements and capabilities for communication that may be associated with specific tasks, and information relating to hardware and software considerations for various communication devices 12.

All of the knowledge bases that have been described herein have been described for purposes of example, as a knowledge base may be implemented for a specific function related to generating a component of a robotic device 12. The knowledge database will generally store information pertaining to various components and design information that it may use to implementing a task that has been specified in the task specification. Various information is stored in the knowledge databases specifically related to whether specific components are suitable for a specific task, including information pertaining to whether there are any specific requirements (including pre and post considerations that must be satisfied before use of any component). Component information may include details regarding the general suitability of components for certain devices. For example, propellers are generally suited for water-based devices. Other information regarding the components may include specific suitability details (i.e. sonar sensors with a 0.8 m range are suitable for robotic devices not larger than 1 m×1 m×1 m), past uses, or inferred future uses based on defined suitability and past usage. General descriptions of particular devices also allow any suitable device to be selected by a user or the generator from a selection of devices. For example, a task specification may only indicate that a light-sensor device is required, allowing the generator or program to choose any device that is described as a light sensor in the system to implement this role (i.e. the cheapest light sensor available could be chosen). The number of generators that are associated with the creation of a robotic device 12 may vary and the method by which the generators are accessed is described in further detail below. The respective knowledge databases may be updated by an administrator who, for example may add a specification of a particular sensor and the function it performs to the robot generator knowledge database 64, and through creation of other robotic devices 12, where the specifications regarding the task and the components associated with that robotic device 12 are then stored in the respective databases.

Figure 5:
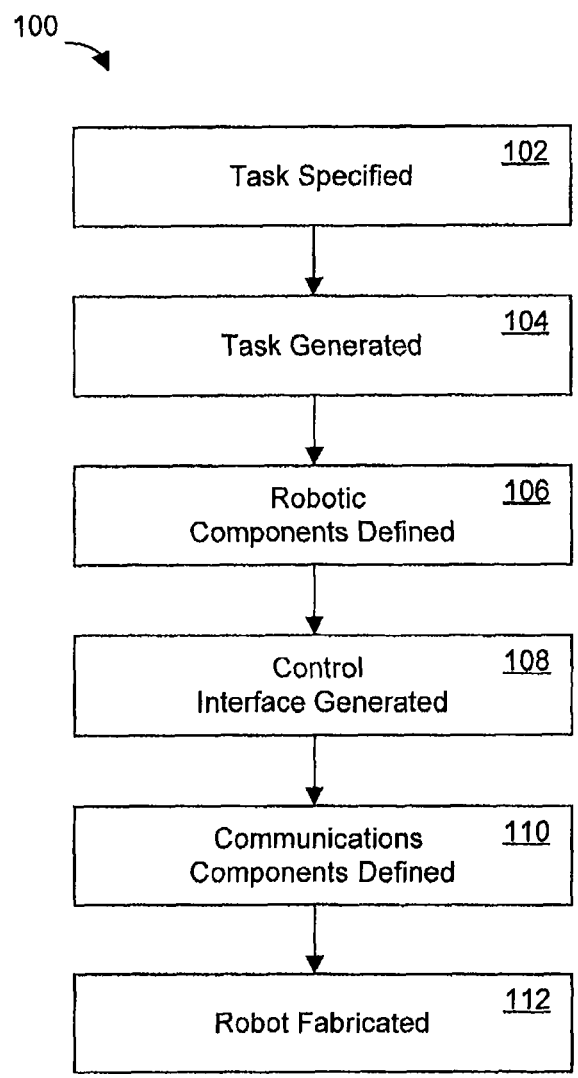
FIG. 5 is a flowchart illustrating the steps of a robot generation method.

Reference is now made to FIG. 5, where a flowchart illustrating the steps of a robot creation method 100 is shown. The robot creation method 100 provides a high level overview of the process undertaken to create a robot. Method 100 begins at step 102, where the user is asked to provide a description of the tasks and constraints associated with the environment, that the robotic device 12 is to operate in. Step 102 is further described with respect to FIG. 6, and the task specification method 150. At step 104, based on the description of the tasks provided by the users, a task list is generated by the task generation module. Upon the task lists being generated, method 100 proceeds to step 106, where the various components that will make up part of the robotic device 12 are determined. At step 106, the various components, including the hardware and software components that are included in the robotic device are defined based on the task list that has been specified. Method 100 then proceeds to step 108, where a control interface is defined. The control interface is defined by the interface generator module through engaging with the interface generator knowledge database 66. The control interface allows for the user to interact with the robotic device 12 by providing further instructions to the robotic device 12, and by receiving updates as to the status of the robotic device 12 and its interactions within the specific environment. Method 100 then proceeds to step 110, where the communication components that allow for the robotic device 12 to communicate with other external devices or other robotic devices 12 or objects within an environment are defined. The communication components may allow for electronic data interchange with other devices and components associated with other robotic devices 12, or may be such that they provide for voice communication abilities for when the robotic device 12 interacts with humans within an environment. Method 100 then proceeds to step 112, where the robotic device 12 is fabricated or constructed. In an exemplary embodiment, a RSOC may be created at the fabrication steps, where the RSOC in an exemplary embodiment may contain all processing and computation functionalities, high level functionalities (sensor/actuator) and the connections for input/output capabilities. The RSOC may be created by FPGA programming where a FPGA compiler is used to produce the embedded chip. As discussed above with respect to the fabrication module 28, the robotic device 12 may be constructed based on a combination of manual and mechanical fabrication. For example, CNC fabrication may used to fabricate the metal components associated with the device 12. Method 100 has been described with respect to each module of the generator application 22 being engaged to provide one or more components associated with the robotic device. It should be noted that the robot creation method 100 operates, in an exemplary embodiment, by first determining whether any specific components require generation and when certain components require generation, then the appropriate modules are engaged. Also, construction of a robotic device may comprise physical or virtual components, and a RSOC may exist in a simulated or virtual manner.

Reference is now made to FIG. 6, where the processing step 102 as shown in FIG. 5, and described above, is described in further detail with respect to a specification method 150. The task specification method 150 is used to generate a set of specifications for the tasks that a robotic device 12 is to perform. Method 150 begins at step 152, where the user provides descriptions of the environment within which the robotic device 12 will operate. The user may provide various details regarding the environment. For example, if the user has specified their backyard (for which co-ordinates have been provided or are available through the knowledge base), the user provides landmark or constraint information associated with the environment and for example may specify landmarks such as pools, and flower beds. Based on the landmarks that have been defined, constraints may be specified, which would include instructions to avoid. Specifically, in an exemplary embodiment, at step 152, the user may provide information regarding the navigational constraints that may be present in the particular environment, and a description of other objects that may be present in the environment (for example, landmarks). Further, the user may provide a map of the environment within which the robotic device will operate. A map may be provided through one or more various methods, including a sketching program, or drawing program or uploading a map that is recognizable to the system 10. A further description of the provision of maps is provided with reference to FIG. 8. Maps may also be created dynamically using sensor provided data or by accessing existing data systems containing pertinent information eg: Google Maps, etc.

Method 150 then proceeds to step 154, where a check is performed to determine whether the user has provided a sufficient description of the environment. Such a determination is made first by analyzing the task description to determine which type of constraint information would be required with regards to the environment, and then checking whether such constraint information has been provided. For example, if a task description has been provided where the robotic device 12 is to move in the backyard, but should avoid flowerbeds, then a check is performed to determine whether information regarding the flowerbeds has been provided. If it is determined at step 154, that a sufficient description has not been provided, method 150 returns to step 152, where the user is requested to provide further details regarding the environment. If at step 154, it is determined that the user has provided sufficient information regarding the environment, method 150 then proceeds to step 156. Based on a task that has been specified by the user, more detailed specific information is requested from the user regarding the task. For example, where the user has specified that a robotic device is to cut grass, then further information regarding time, speed, date, length, obstacles, area and terrain must be provided. If certain information is not provided or is inconsistent then method 150 returns to step 152, with specific questions or directions to the user for more or revised specifications.

At step 156, the user provides information regarding the task description that the robotic device 12 is to carry out. As mentioned above, the user may provide information through more than one method, including through answers in response to multiple-choice questions, or selecting from one or more tasks already defined. The input which the user provides in response to the prompts that are shown are used to form a general task specification of the various tasks/goals that the robotic device 12 is to carry out. Method 150, then proceeds to step 158. At step 158, a check is performed to determine whether the description that has been provided of the task is sufficient, which may include determination as to whether the appropriate location or duration information, where applicable, has been provided. If it is determined at step 158 that a sufficient description has not been provided, method 150 returns to step 156, and the user is queried for further information regarding the task description. If at step 158 it is determined that sufficient information has been provided regarding task descriptions, method 150 proceeds to step 160.

At step 160, the user provides information regarding constraints that are associated with the robotic device. In an exemplary embodiment, examples of such constraints may include constraints associated with the timing and scheduling of particular tasks. For example, the user may specify a maximum time limit associated with a task, or a particular time at which a task must be carried out. Method 150 then proceeds to step 162, where a check is performed to determine whether sufficient information has been provided regarding the various system constraints. If at step 164 it is determined that sufficient information has been provided, method 150 proceeds to step 166. If it is determined at step 164 that a sufficient specification of the system constraints has not been provided, method 150 returns to step 164, where the user is asked to provide more information regarding the system constraints.

At step 166 the user is asked to provide information regarding the fabrication method of the robotic device 12. The user provides information pertaining to how the device 12 should be fabricated, where applicable. For example, the user may select between various options including, but not limited to, determining whether the fabrication should be done automatically by a CNC machine or should the specifications be provided to a manufacturer who will manufacture the appropriate components. At step 168 a check is performed to determine whether sufficient information has been provided. If it is determined at step 168 that sufficient information has not been provided, method 150 returns to step 166, and the user is asked to provide further information regarding the fabrication of the robotic device 12.

At the conclusion of method 150, the system 10 has received from the user a general task description that can then be used to design and develop the robot as is described below. Upon receiving a task description, the system 10 then proceeds as described above to generate a task list that may be implemented by the robotic device 12. As mentioned above, the various tasks specifications are determined based on interaction with the task specification knowledge database 60, and a description is provided herein of the interaction with the respective knowledge databases.

Reference is now made to FIG. 7, where the steps of a task generation method 200 are shown in an exemplary embodiment. The task generation method 200 is carried out where the task description has been received from the user as shown with reference to FIG. 5, step 102. Method 200 further elaborate on the processing that is undertaken at step 104 as described with respect to FIG. 5.

The task generator module 40 in an exemplary embodiment defines the goals or tasks that are to be implemented based on the task specifications that have been provided, and may rank them based on their importance, defines minimum requirements associated with the robotic device and determines the processing requirements associated with the robotic device. The task generator module 40 interacts with the task generator knowledge database 62 to define the task list. The task generator knowledge database 62 as mentioned above, stores information regarding task lists that have been used for other robotic devices, and hardware and software requirements associated with specific tasks. The task generator module 40, based on the task specification provided, analyzes the task specification, and if this task is known to the knowledge database, the task generator will return the associated processing requirements that are associated with completion of this particular task. If the task specification that has been provided does not match a task that has been previously implemented, the task generator returns to the user a list of possible tasks that are similar to the task specification that may then be modified to implement the desired. Similarly, the various other modules that access the respective knowledge databases do so in manner similar to what has been described here.

Method 200 is a recursive function that begins at step 202, where the method receives as input a list of goals based on the task specification that has been provided, and a template that is to be used to specify the requirements associated with each goal. Method 200 then proceeds to step 204 to determine, whether the list of goals that have been provided do in fact contain one or more goals. If the list of goals/tasks is empty this means that the no goals remain for which a task must be specified. If at step 204 it is determined that there are no tasks/goals that have been input, method 200 proceeds to step 206, and the template that has been determined is returned to the generator module 40. If at step 204, if it is determined that the task list or goal list is not empty, method 200 proceeds to step 208. At step 208, a check is performed to determine whether the computational resources are exhausted. When the computational resources associated with method 200 have been exhausted this indicates that a task list for the provided for task specifications will never be generated. Situations, where the computational resources have been exhausted, include but are not limited to, where the associated task generator knowledge database 62 is empty, which would indicate that a task list cannot be generated, and also where there is a shortage of memory for storage. When it is determined that the computational resources have been exhausted, method 200 proceeds to step 210, where a failure message is generated indicating that a task list for the particular task specifications will not be generated. If at step 208 it is determined that the computational resources have not been exhausted, method 200 proceeds to step 212. At step 212, the list of goals or tasks are sorted by the order of importance of each goal. The importance of each goal may be determined, where the user has specified a priority associated with a specification of each task they have provided. As an example, where the user is specifying the task descriptions associated with a robotic device 12, that is to operate within the home environment, some task descriptions may be given higher priority than others. Method 200 then proceeds to step 214, where for each goal or task, the knowledge database is searched to determine whether there is any knowledge pertaining to this particular task specification, and if there is that particular knowledge or information is stored in the template. This process is undertaken for each goal. At the conclusion of method 200, a template is returned, where for each task specification that was provided as input information is returned that is used as input to the next generator, and in this case, a task list is generated.

The respective other modules, including the robot generator module, and the interface generator module carry out methods similar to method 200, wherein their respective knowledge databases are accessed through provision of a set of goals that are provided as input for which the knowledge databases are searched. The goals relate to input for which the knowledge databases contain information that is used to generate the specifications and components for the robotic device 12. The information that is returned is then used in generating the robotic device 12.

Figure 8:
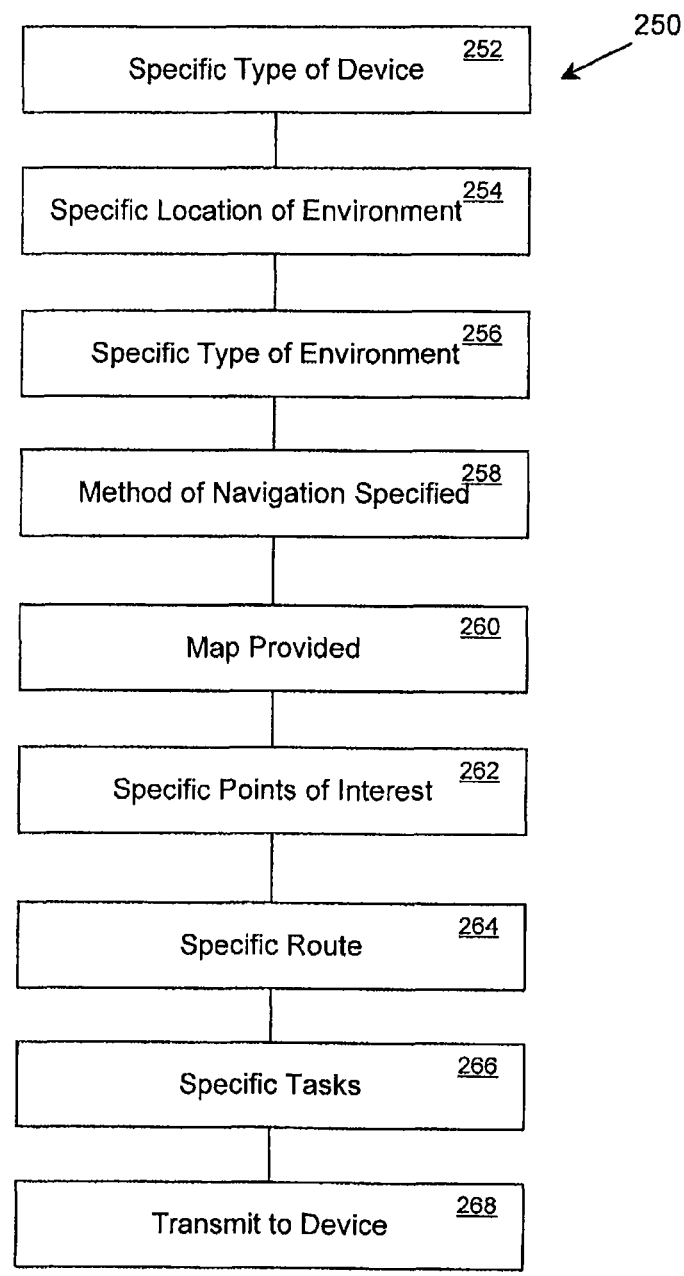
FIG. 8 is a flowchart illustrating the steps of an environment specification method.

Reference is now made to FIG. 8, where a flowchart illustrating the steps of an environment specification method 250 is shown in an exemplary embodiment. The environment specification method 250 describes in further detail the steps that are undertaken in method 150, primarily at steps 152 and 156. The environment specification method describes how the user may specify an environment and how the user may associate certain tasks with the areas or routes in the environment. The environment specification method 250 described herein, describes one example of how an environment may be specified.

The environment specification method 250 is described with reference to FIGS. 9 to 13, which provide sample screen shots that are used to better illustrate the functionality that is described in the respective method steps.

Figure 9:
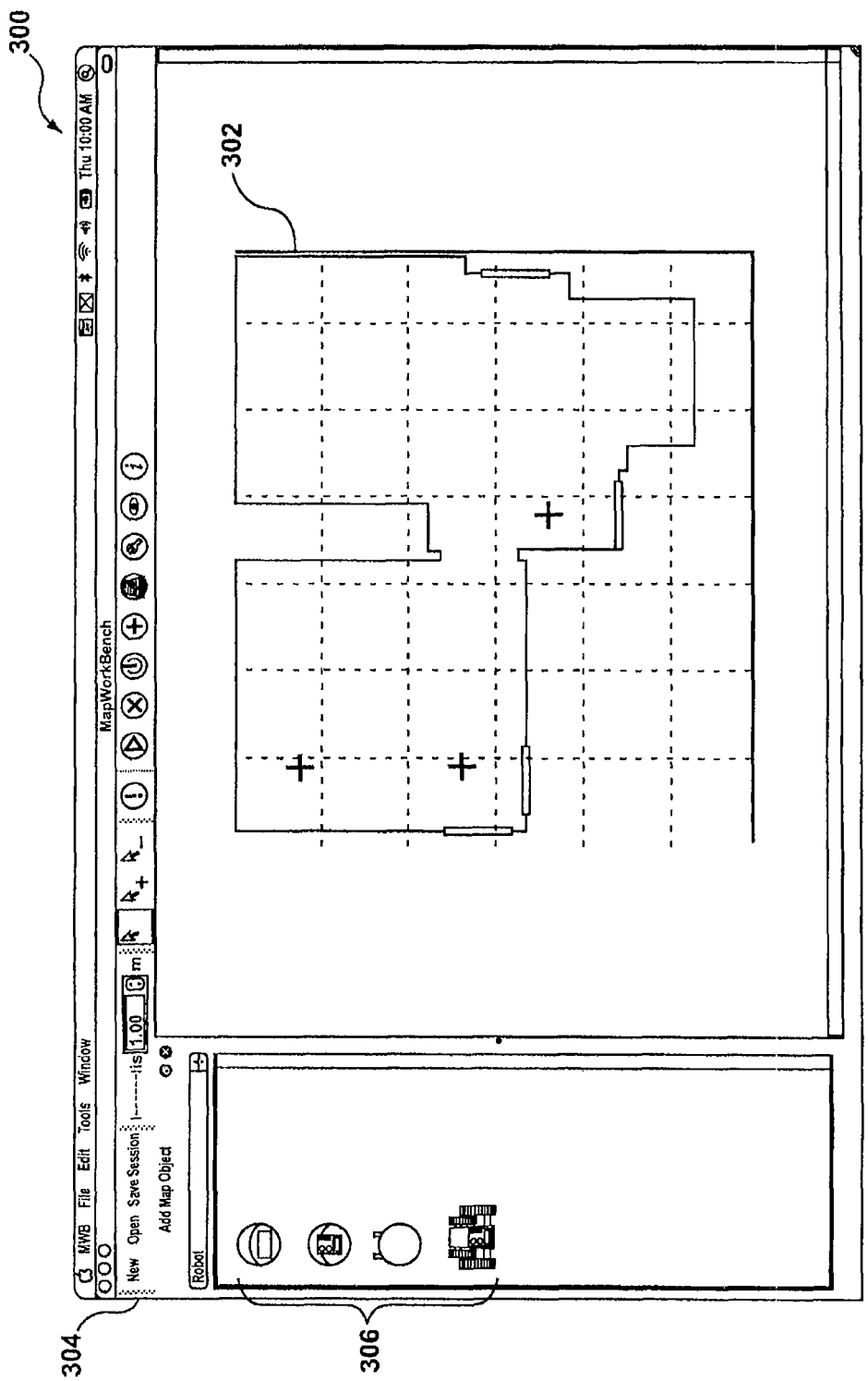
FIG. 9 is a screenshot of a sample map editor window.

Method 250 begins at step 252, where the user may first specify the type of robotic device 12 that is to be used in the environment. The robotic device 12 selected at step 252 may be a mobile robotic device or a stationary robotic device. Method 250 then proceeds to step 254, where the user specifies whether the environment is an outdoor or indoor environment. Method 250 then proceeds to step 256 where the user specifies whether the environment is a real environment, a virtual environment or a mixed reality environment. Method 250 then proceeds to step 258, where the user specifies whether the device is to navigate the environment under their own control, or whether the device is to be controlled by external controls such as user commands inputted through a joystick. In an exemplary embodiment, the navigation method may be based on the provision of specific points within an environment, or through allowing the robotic device 12 to navigate the environment in a wander mode, where the device 12 explores the environment without following a predefined path. Method 250 then proceeds to step 260, where the user provides a map of the environment that the robotic device 12 is to operate in. Reference is made to FIG. 9, where a sample map editor window 300 is shown in one embodiment. The map editor window 300 as described herein allows the user to specify the layout of an environment, various points within the environment, and tasks that are to completed within the environment. The map that is provided by the user at step 260 may be created by the user through providing the respective dimensions in a map specification window 302. The user may specify the dimensions of the environment in the map specification window through utilization of various tools that are provided in the tools menu 304. The user may also select the robotic device 12 for which the respective environment is being specified through use of the device selector window 306. The map editor window 300 of FIG. 9 is shown as one example of the method by which environments may be specified. Alternatively, the user may upload maps that are either two or three-dimensional. The geographic areas that are covered by these respective maps are not limited to room size dimensions, and may represent maps of any dimensions.

Figure 10:
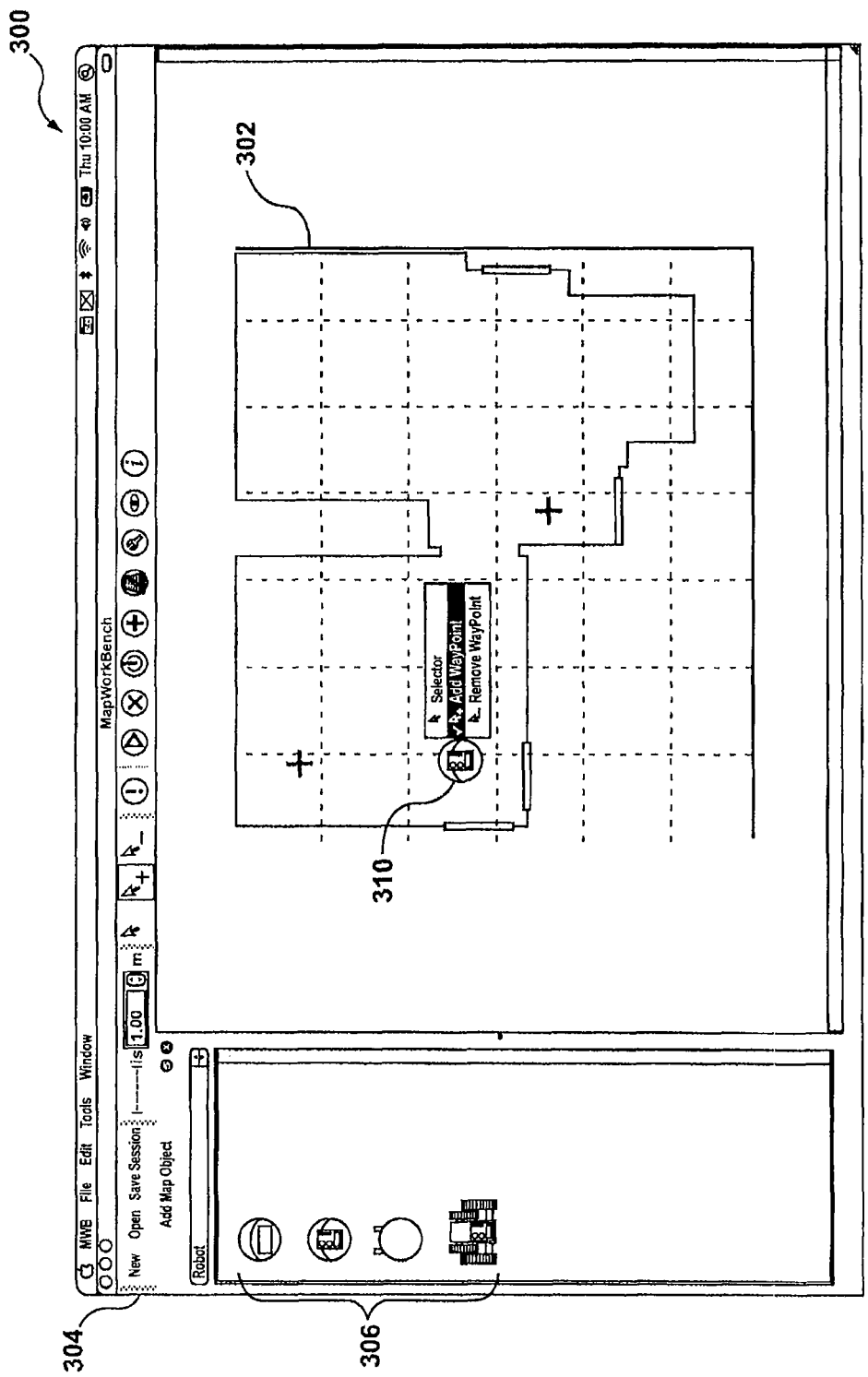
FIG. 10 is another screenshot of a sample map editor window.
Figure 11:
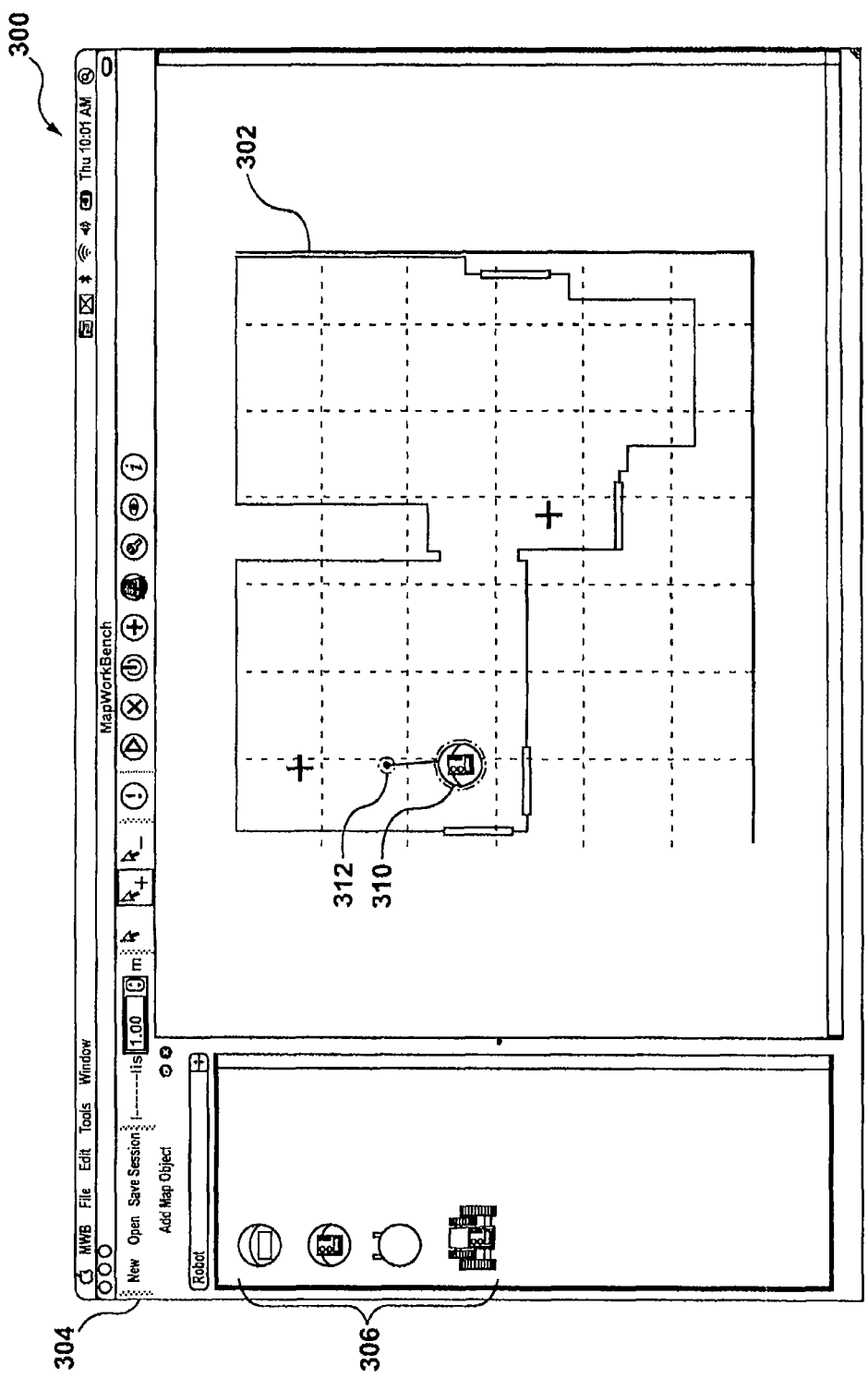
FIG. 11 is another screenshot of a sample map editor window.
Figure 12:
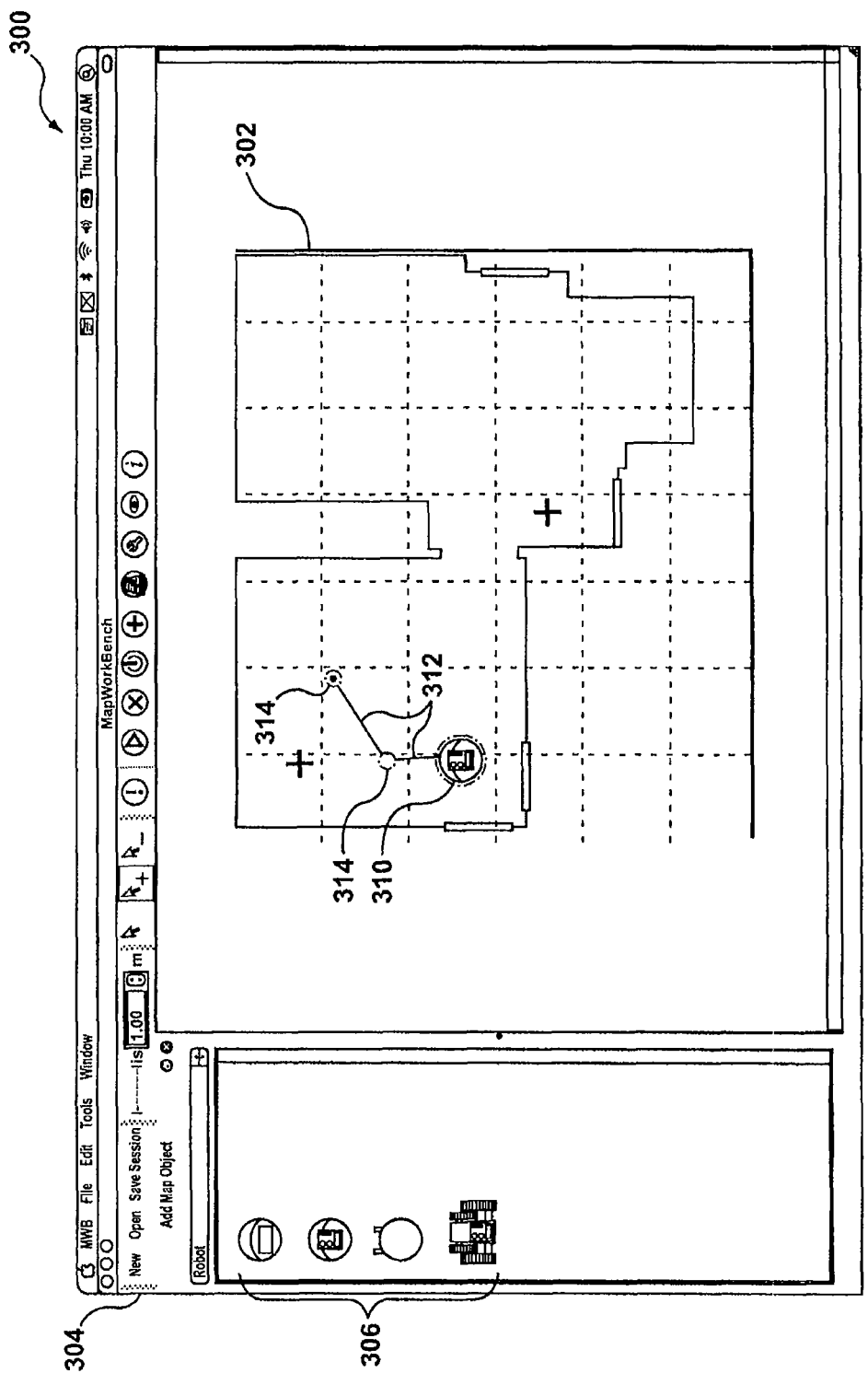
FIG. 12 is another screenshot of a sample map editor window.
Figure 13:
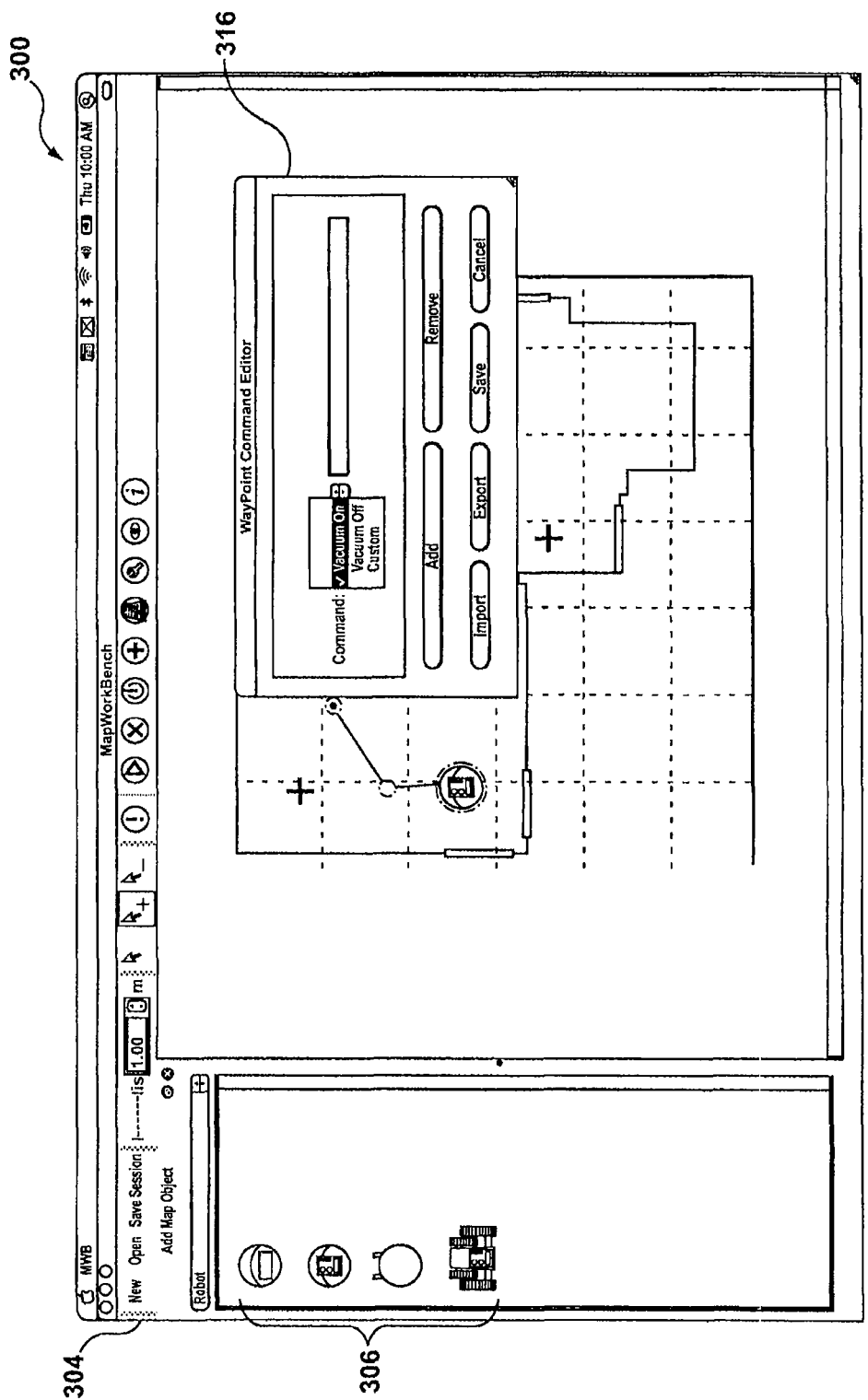
FIG. 13 is another screenshot of a sample map editor window.

Method 250 now proceeds to step 262, where the user may select an area upon the map to specify a particular waypoint or point of interest. A point of interest may be a starting point, stopping point, or point of transition. Reference is made to FIG. 10, where the map editor window 300 is shown where the user has selected a point of interest 310. Upon specifying the point of interest 310, method 250 proceeds to step 264. At step 264, the user may specify a direction of travel or route that the robotic device 12 is to take from the point of interest 310. The route is specified in an exemplary embodiment, however, it should be noted that the robotic device 12 may also be required to determine a route between certain points that have been specified. Reference is now made to FIG. 11, where the map editor window 300 is shown, where the user has specified a route 312 from the point of interest 310 that the robotic device 12 should follow. Reference is now made to FIG. 12, where a point of interest 310 is shown with two stopping points 314. The stopping points 314 are where a robotic device 12 may perform a task or may change their direction of travel. Method 250 then proceeds to step 266, where the user may specify tasks that are to be undertaken at the points of interest 310, the stopping points 314 or along the route 312. Reference is made to FIG. 13, where the map editor window 300 is shown with a task selector window 316. The task selector window 316 is used to select one or more tasks that are to be completed by the robotic device 12. Once the user has completed specifying the various points of travel for the robotic device 12 within the respective environment and when the tasks to be completed at the respective locations are specified, method 250 proceeds to step 268. At step 268, the respective maps and tasks are transmitted to the robotic device 12. The respective information, in an exemplary embodiment is transmitted to the robotic device through UDP. Also, predefined tasks may also be transmitted to the robotic device where the device is to carry out certain tasks.

Figure 14A:
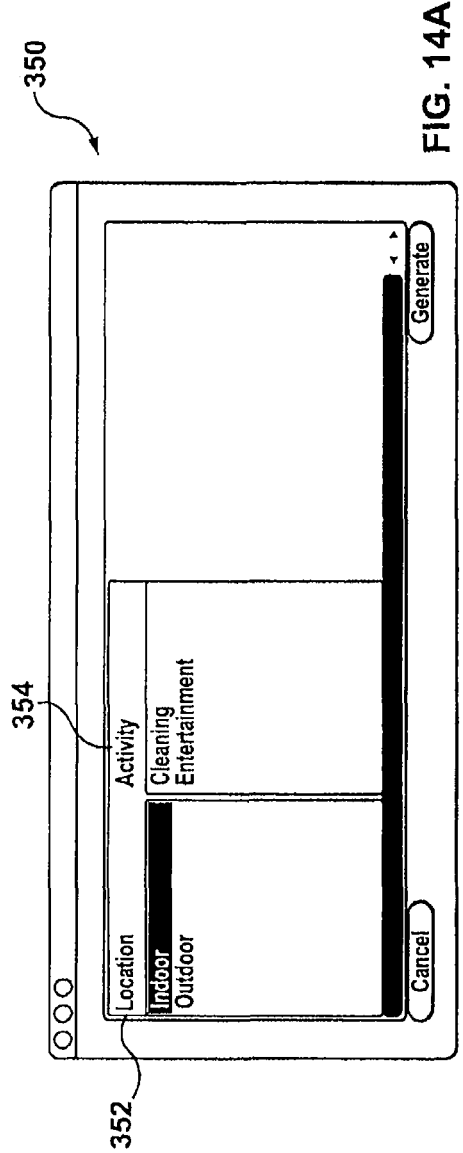
FIG. 14A and FIG. 14B are sample screenshots of task specification windows.
Figure 14B:
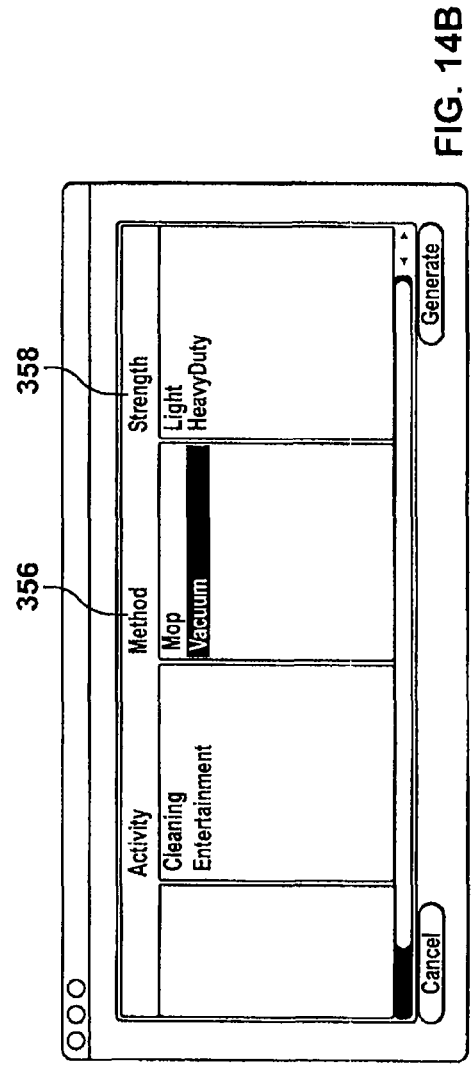

As discussed above, the user when specifying tasks may be presented with various options to fully detail the functionality associated with the task that is being specified. Reference is now made to FIGS. 14A and 14B where a sample set of screen shots that are used when specifying a task are shown. Reference is now made to FIG. 14A and FIG. 14B, where a task specification window 350 is shown in one embodiment. The task specification window 350 will vary depending on the tasks that are being specified. The task specification window 350 shown in FIGS. 14A and 14B is used to specify a task that is to be completed for a robotic device 12, where the tasks are selected from predefined tasks that are associated with the system. FIGS. 14A and 14B show that the user has chosen a task by first specifying a location 352. As will be understood by one of skill in the art the categories that are provided with reference to FIGS. 14A and 14B are provided for purposes of example, and different types of categories may be used when specifying tasks, and the users may be presented with multiple options within a category. The location field 352 allows a user to specify whether the task is to be completed indoors or outdoors. The user is then asked to select the type of activity that is to be performed from the activity field 354. The activity field 354 allows a user to select from the type of activity that is to be performed. In this example, the user has selected "cleaning" as the type of activity that is to be performed by the robotic device 12. Upon selection of the type of activity, the user selects from a method field 356 with regards to the type of cleaning activity. In this example, the user has chosen to vacuum. The user then specifies the type of vacuuming that is to take place, by indicating a strength in the strength field 358. The categories that are shown to the user along with the options within each category depend on the previous selections made by the user and the options that have been specified in each category.

As described above, robotic devices 12 may also operate as part of a robotic team 14. A robotic team refers to two or more robotic devices that exist together in the same environment. The team of robotic devices 14 may exist in a physical environment, virtual environment or in a mixed environment. Within the environment, one or more of the team members may be used to control the respective other devices 12. Within the robotic team, the robotic devices 12 that may control the other devices 12 are referred to as controlling robotic devices. The controlling robotic devices may be a robotic server or have access to a robotic server. The controlling device monitors the respective actions, and requirements within an environment and may communicate with the robotic server when new components are required for the other robotic devices that are being controlled. For example, where a new task is to be performed by the controlled devices within an environment, new components may be required for this task completion, including updates as to the new task specification. The controlling device may interact then with the robotic server and specify the new task information, and the robotic server would proceed to determine the various components and subsequent modifications that may be necessary for each of the respective controlled robotic devices. The controlling robotic devices may also make requests to the robotic server for new components for itself as well.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims hereto appended.

The invention claimed is:

1. A method for the automated generation of a robotic device, the method comprising the steps of:
    a) providing a robotic server having a task specification module, a task generator module and a robot generation module;
    b) eliciting and receiving user input at the task specification module to determine a task specification for one or more tasks for the robotic device;
    c) automatically determining a task list comprising one or more tasks based on the provided task specification using the task generator module;
    d) automatically determining based on the task list provided, one or more movement components, one or more processing components, and logic components required to execute one or more tasks using the robot generation module;
    e) automatically generating the logic components required to execute one or more tasks, and embedding the logic components onto a recordable medium associated with the robotic device;
    f) generating the robotic device by combining the determined one or more movement components, the one or more processing components and the logic components.

2. The method of claim 1, further comprising the step of automatically determining specifications for the one or more movement components, the one or more processing components, and the one or more logic components for use in generation of the robotic device.

3. The method of claim 2, wherein a physical robotic device is constructed by assembling the one or more movement components in combination with the processing components and the recordable medium.

4. The method of claim 3, wherein a plurality of physical robotic devices are created and operate in a robotic team environment.

5. The method of claim 2, wherein a virtual robotic device is constructed by creating virtual representations of the one or more movement components that are combined with the one or more processing requirements and the logic components.

6. The method of claim 5, wherein a plurality of virtual robotic devices are created and operate in a robotic team environment.

7. The method of claim 1, further comprising the step of eliciting and receiving user input regarding environmental specifications regarding the environment that the robotic device is to operate in.

8. The method of claim 1, wherein the robotic device is constructed with physical and virtual components that represent the one or more movement components that are combined with the one or more processing requirements and the logic components.

9. The method of claim 8, wherein a plurality of robotic devices with mixed physical and virtual components are created and operate in a robotic team environment.

10. The method of claim 1, wherein the method is undertaken at a robotic server.

11. The method of claim 10, wherein a robotic device is a robotic server.

12. The method of claim 7, wherein the step of eliciting and receiving user input regarding environmental specifications regarding the environment that the robotic device is to operate in comprises:
   a) inputting a map that defines the area of the environment;
   b) inputting a starting point indicating a position within the area that the robotic device is to start operating from;
   c) inputting one or more stopping points along a route emanating from the starting point that the robotic device is to follow; and
   d) inputting one or more tasks to be completed by the robotic device at the starting points, stopping points or along the route.

13. The method of claim 12, wherein the map is a pre-existing map that is uploaded.

14. The method of claim 12, wherein the map is created to define the area of the environment.

15. The method of claim 12, wherein the specified environment is transmitted to the robotic device.

16. The method of claim 12, wherein the robotic device is one of a physical robotic device, a virtual robotic device, and a robotic device with mixed physical and virtual components.

17. The method of claim 1, wherein the step of eliciting and receiving user input via a task specification module to determine a task specification for one or more tasks for the robotic device comprises:
   a) specifying whether the robotic device is a physical robotic device or a virtual robotic device, or a robotic device with mixed physical and virtual components;
   b) specifying a location for the robotic device to operate in;
   c) specifying an activity for the robotic device to undertake; and
   d) providing detailed information regarding the activity that the robotic device is to undertake.

18. The method of claim 17, wherein the location is one of an indoor location, an outdoor location and a combination of an indoor and outdoor location.

19. The method of claim 17, wherein the activity is selected from one or more activities that the robotic device has previously undertaken.

20. The method of claim 17, wherein the activity is an activity that has not been previously undertaken by the robotic device.

21. The method of claim 17, wherein a robotic device is generated to accomplish the one or more tasks.

22. The method of claim 17, wherein the robotic device is one of a physical robotic device, a virtual robotic device and a virtual robotic device with mixed physical and virtual components.

23. The method of claim 17, wherein the robotic device is a physical robotic device and is configured to operate in one of a physical environment and a mixed virtual and physical environment.

24. A method of automatically generating a robotic device, the method comprising:
   a) providing a robotic server having a task specification module, a task generator module and a robot generation module;
   b) specifying whether the robotic device is a physical robotic device or a virtual robotic device, or a robotic device with mixed physical and virtual components;
   c) specifying a location for the robotic device to operate in;
   d) specifying an activity for the robotic device to undertake;
   e) providing detailed information regarding the activity that the robotic device is to undertake using the task specification module;
   f) automatically determining a task list using the task generator module based on at least one of the location, the activity and the detailed information, the task list comprising at least one task;
   g) automatically determining a plurality of robotic components that are to be included in the robotic device based on the task list using the robot generation module, the plurality of components including at least one logic component;
   h) automatically generating the at least one logic component required to execute the at least one task on the task list and embedding the at least one logic component onto a recordable medium associated with the robotic device; and
   i) generating the robotic device by combining the determined plurality of robotic components.

25. The method of claim 24, wherein at least one of the steps of automatically determining a task list and automatically determining a plurality of robotic components comprises querying a knowledge base module comprising at least one knowledge database.

* * * * *